United States Patent Office 3,471,344
Patented Oct. 7, 1969

3,471,344
THIXOTROPIC ORGANIC LIQUID PROPEL-
LANT COMPOSITIONS WITH SOLID STOR-
AGE CHARACTERISTICS
William B. Tarpley, Jr., West Chester, Pa., assignor to
Aeroprojects Incorporated, West Chester, Pa., a cor-
poration of Pennsylvania
No Drawing. Filed Sept. 30, 1959, Ser. No. 844,608
Int. Cl. C06b 19/04; C10l 7/02; C06d 5/00
U.S. Cl. 149—18                                    3 Claims This invention relates to organic liquid propellant compositions and methods of production thereof.

Liquid propellants are fluids whose chemical and thermodynamic changes under appropriate conditions are utilized to produce backward momentum in order to provide forward thrust to a device such as a rocket. Both organic and inorganic liquids are used as propellants but, while the inorganic liquid propellants are of several different types, the organic liquid propellants are classed principally as liquid fuels although they are of varied chemical composition and performance characteristics.

In considering the suitability of a particular liquid propellant, consideration must be given not only to its performance characteristics and its availability but also to such factors as safety, stability, and ease of handling. For example, all liquid propellants are subject to inconvenient and sometimes hazardous spillage, whether through tank-penetration from the outside or otherwise. Moreover, there exists a problem in connection with the addition of desirable solid substances to the liquid propellants, these substances generally being of greater or lesser density than the liquid, these density differences producing rapid settling of even the finest particulate solids available. Also, mechanical stirring sometimes produces dispersions containing agglomerated and clumped material, causing such dispersions to settle rapidly. Likewise, desirable monopropellant compositions have not been prepared because of the difficulty in suspending particulate high-energy fuels in liquid oxidizers or particulate high-energy oxidizers in liquid fuels. Thickening the liquid to increase its viscosity reduces the tendency of solid particles to settle but makes the material difficult to pump.

Thickened hydrocarbon or alcohol-based fuels are well known, being so-called solid or gelled fuels, their viscosity having been substantially increased by means of the addition of thickeners such as rubber, various soaps, etc., usually in rather large quantity and utilizing special chemical, thermal, mechanical, and curing techniques. These fuels have been of interest in incendiary munitions, as hydraulic fracturing media, etc., for their shape-retaining solid-like properties, generally requiring combustion or the addition of de-gelling agents to release them partially or completely from the gelled state.

This invention has as an object the provision of novel organic liquid propellants.

This invention has as another object the provision of a novel method for making organic liquid propellants.

This invention has as yet another object the provision of organic liquid propellants having good storage, pumping, and metering characteristics.

Other objects will appear hereinafter.

The organic liquid propellants of the present invention are essentially unpourable, i.e., gels or gel-like, under storage or low shear conditions. Such materials, if spilled, will remain in a mass rather than splashing and running as would the conventional organic liquid propellants. Furthermore, because the apparent viscosity under conditions of low or zero flow is extremely high, the rate of Stokes settling of suspended particulate matter is negligible. However, when modest to rapid flow is initiated as by pressure or by pumping, the apparent viscosity will become lower, i.e., the composition will exhibit shear thinning, and under high shear conditions the apparent viscosity will reduce to nearly that of the conventional organic propellant fluids. The organic liquid propellant compositions of the present invention, therefore, have the desirable storage characteristics of solid materials but can be induced to flow like liquids when desired by the application of sufficient shear.

The organic liquid propellant compositions of the present invention comprise a major weight proportion of an organic liquid propelling agent and a minor weight proportion of a gellant, which gellant does not appreciably adversely affect the propelling properties of the propelling agent and is not destroyed by that agent. As aforesaid, the organic liquid propelling agent may comprise an organic liquid or it may comprise an organic liquid containing particles, i.e., a slurry. With those organic liquid propellant compositions of the present invention which include solid particles there is the added advantage, in addition to the flow behavior, of prevention of settling of the solid particles. In addition, the organic liquid propellant compositions of the present invention may include additives which aid in the blending between the propeling agent and the gellant, such as surface active agents and the like.

The organic liquid propellant compositions of the present invention, as above indicated, may include a wide variety of organic liquid propelling agents, such as various hydrocarbon fuels; organic derivatives of hydrazine (such as unsymmetrical dimethyl hydrazine, monomethyl hydrazine, etc.); various alcohols; monopropellants (such as ethylene oxide, nitromethane, etc.); etc.

A wide variety of gellants may be utilized in the organic liquid propellant compositions of the present invention. It is essential that the resultant composition of organic liquid propelling agent and gellant exhibit the flow behavior above described. It is likewise essential that the gellant be compatible with the propelling agent, namely, that the gellant should not interfere with the propelling characteristics of the propelling agent nor be destroyed by that agent. The gellant may be in either powder or liquid form, the powder preferably being very finely divided and the liquid preferably being non-aqueous. Thus, while it is possible to form a mixture of unsymmetrical dimethyl hydrazine and aqueous colloidal silica having the requisite flow behavior, the water contributes nothing to the end application and, being incompletely miscible in the propelling agent, detracts from the quality of the composition, so that powdered colloidal silica is preferable, and very finely powdered colloidal silica disperses in the liquid more easily and completely.

In order to achieve particular characteristics, the organic liquid propellant compositions of the present invention may comprise a mixture of gellants.

The amount of the gellant present in the organic liquid propellant compositions of the present invention should be at the lowest possible level which confers the desired characteristics upon the organic liquid propellant composition, it being understood that flow initiation can be adjusted for a given situation by the amount of gellant which is added. In all cases the major weight proportion of the organic liquid propellant composition should be the propelling agent. Generally, the weight proportion of the gellant will be less than ten percent, and preferably will range between approximately two weight percent and eight weight percent.

As heretofore indicated, surface-active materials may be utilized when desirable and if compatible. When used, such surface-active materials are generally present in the organic liquid propellant compositions of the present invention in relatively low weight percentages, which percentages are always less than the amount of the gellant and are generally less than one weight percent of the composition. Examples of suitable surface-active materials which might be used with fuels include sulfonates such as the alkyl sulfonates, fatty acid alcohol amine compounds, alkyl aryl polyether alcohols, an oxidation-resistant fluorochemical anionic surfactant, etc.

It is essential if optimum performance is to be achieved that substantially complete dispersion of the propelling agent and the gellant (and the surface-active material if it is used) be effected. This can be accomplished in many cases by "shear working" in conventional equipment. However, ultrasonic dispersion may be employed advantageously, especially in the case of compositions comprising, in addition to the gellant, organic liquid propelling agents to which are added solid fuel or oxidizer particles, in order to reduce dispersion time, reduce gel concentration, remove oxide coatings, etc.

In the following illustrative examples, the order of addition of the components is generally not critical. It is necessary for substantially complete dispersion of the propelling agent and the gellant to be achieved, but this can be accomplished under conditions set forth in each example.

Example I

Three weight percent of colloidal silica prepared by the vapor phase hydrolysis of a silicon compound in a hot gaseous environment was gradually added to JP-4 hydrocarbon fuel during two minutes of hand-stirring. It was determined that the mixture had a high viscosity at slow flow, while at high flow it had a low viscosity and was pumpable.

Example II

Three weight percent of the colloidal silica referred to in Example I was added to 1,1-dimethyl hydrazine, and the mixture was hand-stirred for two minutes. It was determined that the resultant composition had a high viscosity at slow flow, while at high flow it had a low viscosity and was pumpable.

Example III

The procedure of Example II was duplicated except that in place of only unsymmetrical dimethyl hydrazine there was substituted a mixture in which the said hydrazine was present to the extent of 75 weight percent, aluminum powder having a mass mean diameter of 8 microns was present to the extent of 20 weight percent, and the colloidal silica referred to in Example I was present to the extent of five weight percent. The resultant mixture had a high viscosity at slow flow, while at high flow it had a low viscosity and was pumpable. At the end of several weeks of storage of a quantity of this material, the aluminum remained suspended without any appreciable settling.

Example IV

The procedure of Example III was duplicated except that a fractional weight percent of the sorbitan monooleate detergent was added during the mixing process. The resultant mixture appeared to be a good dispersion which had a high viscosity at slow flow, while at high flow it had a low viscosity and was pumpable.

Example V

The procedure of Example III was duplicated except that the mixture was agitated by, instead of hand-stirring, subjection to ultrasonic agitation at a frequency of 20,000 cycles per second for one minute. It was determined that the resultant mixture had a high viscosity at slow flow, while at high flow it had a low viscosity and was pumpable.

Example VI

A mixture of 57.5 weight percent of monomethyl hydrazine, 40 weight percent of ammonium perchlorate, and 2.5 weight percent of the colloidal silica referred to in Example I was hand-stirred for approximately two minutes, i.e., until it was substantially completely dispersed and essentially unpourable, having a gel-like appearance, when stirring stopped. It was determined that the resultant monopropellant had a high viscosity at slow flow, while at high flow it had a low viscosity and was pumpable.

Example VII

Ninety-five weight percent of aniline and five weight percent of the colloidal silica referred to in Example I were stirred together for two minutes. It was determined that the resultant mixture had a high viscosity at slow flow, while at high flow it had a low viscosity and was pumpable.

Example VIII

Seven weight percent of colloidal silica, of the type referred to in Example I, was stirred with ninety-three weight percent of nitromethane was approximately two minutes. It was determined that the resultant monopropellant had a high viscosity at slow flow, while at high flow it had a low viscosity and was pumpable.

Example IX

Six percent of the colloidal silica referred to in Example I was stirred together with ninety-four weight percent of nitropropane for about two minutes. It was determined that the resultant composition had a high viscosity at slow flow, while at high flow it had a low viscosity and was pumpable.

Example X

Seventy-five weight percent of unsymmetrical dimethyl hydrazine, 20 weight percent of magnesium hydride coated with polyethylene in a diameter size range of 60 to 100 microns, and five weight percent of the colloidal silica referred to in Example I were stirred together for about two minutes until a substantially complete dispersion was obtained. The resultant mixture had a high viscosity at slow flow, while at high flow it had a low viscosity and was pumpable. There was no apparent settling of the solid particles after storage of this material for a period of several weeks.

The compositions of the present invention have good storage characteristics, and when stored remain as high-viscosity materials for extended periods of time. As at high flow rates they are pumpable, the compositions of the present invention may be pumped from location to location and metered.

Satisfactory suspensions which do not settle are provided for the first time by the organic liquid propellant compositions of the present invention which include suspended solid particles.

Inasmuch as the spillage and leakage risks are minimized with the compositions of the present invention, the same are superior to those of conventional organic liquid propellants in terms of safety and ease of handling.

The present invention may be embodied in other specific forms without departing from the spirit or essential attributes thereof and, accordingly, reference should be made to the appended claims rather than to the foregoing specification as indicating the scope of the invention.

There is claimed:

1. An organic liquid rocket propellant component composition having the property of being essentially unpourable under storage or low shear conditions and of becoming fluid and flowing under increased shear comprising a mixture of a major weight proportion of an organic liquid rocket propellant component selected from the group consisting of unsymmetrical dimethyl hydrazine, monomethyl hydrazine, ethylene oxide, nitromethane, aniline, and nitropropane and from two to ten weight percent of colloidal silica.

2. An organic liquid rocket propellant component composition in accordance with claim 1 which includes a minor weight percentage of a surface active agent.

3. An organic liquid rocket propellant component composition in accordance with claim 1 which contains dispersed finely divided particles of a solid rocket propellant component.

References Cited

UNITED STATES PATENTS

| | | | |
|---|---|---|---|
| 2,922,703 | 1/1960 | Bauer et al. | 44—7 |
| 2,921,846 | 1/1960 | Novak | 52—.5 |
| 2,891,852 | 6/1959 | Schaad | 52—.5 |
| 2,570,990 | 10/1951 | Southern et al. | |
| 2,538,516 | 1/1951 | Hannum | 52—.5 |
| 2,046,209 | 6/1936 | Ray | 44—7 |

BENJAMIN R. PADGETT, Primary Examiner

U.S. Cl. X.R.

149—36, 89